US012120486B2

(12) United States Patent
Kervran et al.

(10) Patent No.: US 12,120,486 B2

(45) Date of Patent: Oct. 15, 2024

(54) CANTILEVER MICROPHONE

(71) Applicant: AAC ACOUSTIC TECHNOLOGIES (SHENZHEN) CO., LTD., Shenzhen (CN)

(72) Inventors: Yannick Pierre Kervran, Hk (FR); Scott Lyall Cargill, Eb (GB)

(73) Assignee: AAC Acoustic Technologies (Shenzhen) Co., Ltd., Shenzhen (CN)

( * ) Notice: Subject to any disclaimer, the term of this patent is extended or adjusted under 35 U.S.C. 154(b) by 190 days.

(21) Appl. No.: 17/883,645

(22) Filed: Aug. 9, 2022

(65) Prior Publication Data

US 2024/0056744 A1 Feb. 15, 2024

(51) Int. Cl.
*H04R 19/04* (2006.01)

(52) U.S. Cl.
CPC ....... *H04R 19/04* (2013.01); *H04R 2201/003* (2013.01)

(58) Field of Classification Search
CPC ........ H04R 7/14; H04R 19/04; H04R 19/005; H04R 2201/003; H04R 2307/023; H04R 2410/03; H02N 1/008; B81B 3/0021; B81B 2201/033; B81B 3/0078; B81B 2201/0235; B81B 2203/0163; B81B 2203/0118; B81C 1/0015
See application file for complete search history.

(56) References Cited

U.S. PATENT DOCUMENTS 6,838,738 B1 * 1/2005 Costello .................... G01J 3/26 257/414
8,165,323 B2 * 4/2012 Zhou ........................ H01G 5/16 381/174
9,128,114 B2 * 9/2015 Langereis ........... G01P 15/0802
9,611,135 B1 * 4/2017 Klein ........................ H02N 2/02
2010/0109102 A1 * 5/2010 Chen .................. G01C 19/5719 438/51
2014/0197502 A1 * 7/2014 Dehe ..................... B81B 3/0005 257/416
2017/0015546 A1 * 1/2017 Kautzsch .............. B81B 3/0078
2017/0297895 A1 * 10/2017 Kautzsch .............. B81B 3/0021
2018/0290883 A1 * 10/2018 Kautzsch .............. G01S 7/4811

* cited by examiner

*Primary Examiner* — Carolyn R Edwards
*Assistant Examiner* — Julie X Dang
(74) *Attorney, Agent, or Firm* — W&G Law Group

(57) ABSTRACT

A cantilever microphone includes: a substrate; a cantilever including a rotor frame and a plate covering the rotor frame, where the cantilever includes a first edge fixed to the substrate and a second end opposite to the first edge, a plurality of rotor comb fingers is attached to the plate at an edge of the plate adjacent to the second edge; and a stator fixed to the substrate or attached to a sub structure to allow some displacement from the substrate, where the stator includes a plurality of stator comb fingers, and the stator comb fingers are interdigitated with the rotor comb fingers. For the cantilever microphone, high mechanical sensitivity of the cantilever and high electrostatic sensitivity of the comb structure can be implemented, so as to increase the performance or signal-to-noise ratio of the cantilever microphone.

14 Claims, 6 Drawing Sheets

CANTILEVER MICROPHONE

TECHNICAL FIELD

The present disclosure relates to the technical field of microelectronics and, in particular, to a cantilever microphone.

BACKGROUND

With the development of MEMS micromachining, many MEMS microphone structures have been developed and cantilevers are parts of them. For a cantilever microphone, an edge of a cantilever is anchored at a substrate, and other edges thereof are not fixed. Therefore, when subjected to a pressure, a free edge opposite to an anchoring edge will freely move up and down. Several cantilever MEMS microphone can be found in the literature, mostly using a piezoelectric technology, where the cantilever structure presents at least one piezoelectric layer and charges are created in the latter when the cantilever is subjected to movement actuated by a sound pressure. Infineon has recently proposed a new type of cantilever microphone using a capacitive sensing technology in the reference U.S. Pat. No. 9,938,133 B2. The free edge may be used as a sensing area to create a capacitive sensor. However, the frame structure of the cantilever is specified to be made of monocrystalline silicon which present fabrication advantages but also limitations. Hence, there are opportunities to invent different capacitive cantilever MEMS microphone with other advantages.

SUMMARY

In view of this, a cantilever microphone is provided according to embodiments of the present disclosure, where the rotor frame is made of silicon nitride, silicon oxide, polycrystalline silicon or a combination thereof, and where the comb fingers (either from the rotor or from the stator) can be made from an electrically conductive material or can be made from an electrically insulating material.

In an aspect, a cantilever microphone is provided according to an embodiment of the present disclosure. The cantilever microphone includes: a substrate; a cantilever including a rotor frame and a plate covering the rotor frame, wherein the cantilever comprises a first edge fixed to the substrate and a second edge opposite to the first edge, a plurality of rotor comb fingers is attached to the plate at an edge of the plate adjacent to the second edge; and a stator fixed to the substrate or attached to a sub structure to allow some displacement from the substrate, wherein the stator comprises a plurality of stator comb fingers, and the plurality of stator comb fingers are interdigitated with the plurality of rotor comb fingers. A gap is provided between the plurality of rotor comb fingers and the rotor frame. A material of the rotor frame comprises at least one of polycrystalline silicon, silicon nitride, silicon oxide, or silicon carbide.

As an improvement, the plurality of rotor comb fingers are arranged at a surface of the plate facing the rotor frame, and are vertically formed in a direction perpendicular to the edge of the plate adjacent to the second edge.

As an improvement, a comb gap is provided between one of the plurality of rotor comb fingers and one of the plurality of stator comb fingers adjacent thereto, and the comb gap is within a range from 0.1 um to Sum.

As an improvement, a height of each of the plurality of rotor comb fingers is within a range from 1 um to 50 um; and a height of each of the plurality of stator comb fingers is within a range from 1 um to 50 um.

As an improvement, a ratio of the comb height to the comb gap is within a range from 1 to 100.

As an improvement, the stator further comprises a stator frame, and the plurality of stator comb fingers are fixedly connected to the stator frame.

As an improvement, the stator frame surrounds the plurality of stator comb fingers.

As an improvement, the plate comprises an extension portion extending outside the rotor frame, to cover at least a part of the substrate or the stator.

As an improvement, a material of the rotor frame comprises at least one of polycrystalline silicon, silicon nitride, silicon oxide, or silicon carbide.

As an improvement, a surface of the plate facing the rotor frame comprises a conductive material.

As an improvement, a portion of the plate where the plurality of rotor comb fingers are arranged is made of an electroconductive material.

As an improvement, the plurality of rotor comb fingers and the plurality of stator comb fingers are made of a conductive material.

As an improvement, the plurality of rotor comb fingers are made of an insulating material and the plurality of stator comb fingers are made of a conductive material; or the plurality of rotor comb fingers are made of a conductive material and the plurality of stator comb fingers are made of an insulating material.

As an improvement, the plurality of rotor comb fingers and the plurality of stator comb fingers are made of monocrystalline silicon or polycrystalline silicon.

As an improvement, a distance between the plate and an end of one of the plurality of stator comb fingers adjacent to the plate is controlled, to decrease electrostatic non-linearities and distortion.

It should be understood that the foregoing general description and the following detailed description are merely exemplary and are not intended to limit the present disclosure.

BRIEF DESCRIPTION OF DRAWINGS

In order to more clearly illustrate technical solutions in embodiments of the present disclosure or in the related art, the accompanying drawings used in the embodiments and in the related art are briefly introduced as follows. It should be noted that the drawings described as follows are merely part of the embodiments of the present disclosure, and other drawings can also be acquired by those skilled in the art without paying creative efforts.

REFERENCE SIGNS

Figure 1:
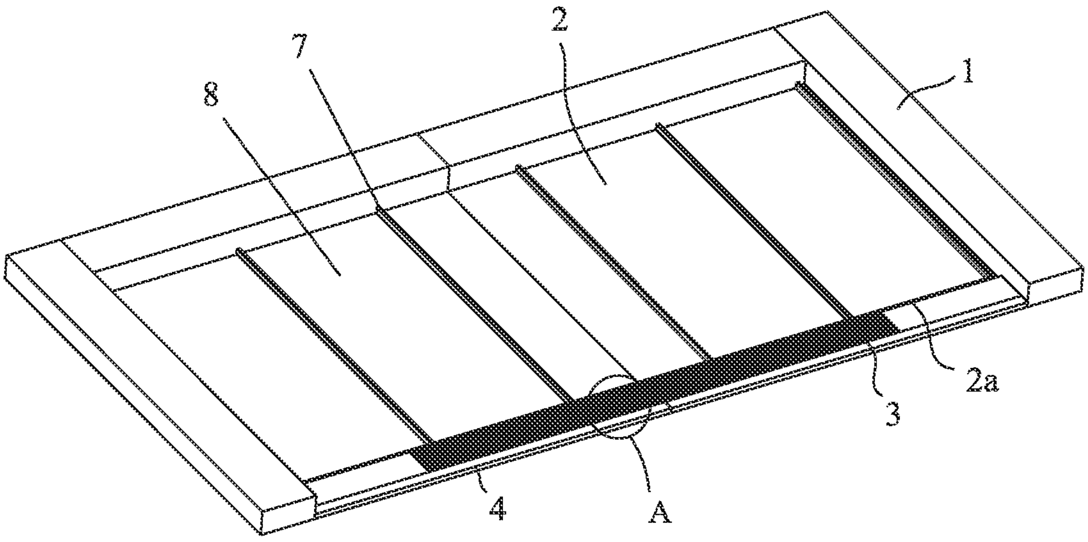
FIG. 1 is a schematic structural diagram of a cantilever microphone according to an embodiment of the present disclosure.

1 substrate
2 cantilever
2*a* second edge
2*b* comb area
2*c* extension portion
3 rotor comb finger
4 stator
5 stator comb finger
6 gap
7 rotor frame
8 plate
9 stator frame The drawings herein are incorporated into and constitute a part of the present specification, illustrate embodiments of the present disclosure and explain principles of the present disclosure together with the specification.

DESCRIPTION OF EMBODIMENTS

The technical solutions in the embodiments of the present disclosure are described in the following with reference to the accompanying drawings. It should be noted that, the described embodiments are merely exemplary embodiments of the present disclosure, which shall not be interpreted as providing limitations to the present disclosure. All other embodiments obtained by those skilled in the art without creative efforts according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association relationship describing associated objects, indicating that there may be three relationships, for example, A and/or B may indicate that three cases, i.e., A existing individually, A and B existing simultaneously, B existing individually. In addition, the character "/" herein generally indicates that the related objects before and after the character form an "or" relationship.

It should be noted that, the expressions such as "upper", "lower", "left", "right" and the like mentioned in embodiments of the present disclosure are described with reference to the placement status in the accompanying drawings, and should not be construed as limiting embodiments of the present disclosure. In addition, it should also be understood that, in the context, while referring to an element being formed "above" or "below" another element, it is possible that the element is directly formed "above" or "below" the other element, it is also possible that the element is formed "above" or "below" the other element via an intermediate element.

FIG. 1 is a schematic structural diagram of a cantilever microphone according to an embodiment of the present disclosure. As shown in FIG. 1, a cantilever microphone is provided according to an embodiment of the present disclosure. The cantilever microphone includes a substrate 1, a cantilever 2 and a stator 4. The cantilever includes a first edge fixed to the substrate and a second edge 2*a* opposite to the first edge. The second edge 2*a* is used as a free end of the cantilever 2. The cantilever 2 includes a rotor frame 7 and a plate 8 covering the rotor frame 7. A plurality of rotor comb fingers 3 is attached to the plate 8 at an edge of the plate adjacent to the second edge 2*a*. The stator 4 may be fixed to the substrate 1, or may be attached to a sub structure to allow some displacement from the substrate. The stator 4 includes a plurality of stator comb fingers 5. The rotor comb fingers 3 are interdigitated with the stator comb fingers 5. There is a comb gap between a rotor comb finger and stator comb finger. In an embodiment of the present, the rotor comb fingers 3 and the stator comb fingers 5 are used as electrodes of the capacitor to create capacitive sensing.

In the technical scheme in the related art, the frame and the combs are fabricated at the same time, by etching the same monocrystalline silicon layer; and the combs are naturally the extension of the frame; they are naturally the same piece of material. For the technical scheme described above, the rotor comb fingers are arranged at the plate of the cantilever, since the frame is made of silicon nitride, the combs cannot be the extension of the frame; the monocrystalline silicon and the silicon nitride cannot be attached by the side anymore as well, so the only way is to attach the combs to the bottom of the plate; and an additional advantage of the plate covering the combs area is to increase the acoustic resistance of the comb gap, which is a good point to increase the SNR of the microphone.

In an embodiment, a material of the rotor frame may include at least one of polycrystalline silicon, silicon nitride, silicon oxide or silicon carbide.

In an embodiment, a material of the plate may include at least one of silicon nitride, silicon oxide polymer, silicon carbide or polysilicon. In a preferred embodiment, a surface, facing the rotor frame, of the plate includes a conductive material. Through using the conductive material for the bottom of the plate, the performance of the cantilever microphone can be improved significantly.

In an embodiment, the rotor comb fingers and the stator comb fingers are made of a conductive material. For example, each of the rotor comb fingers 3 and the stator comb fingers 5 is made of a metallic material. In a preferred embodiment, the rotor comb fingers and the stator comb fingers are made of monocrystalline silicon or polycrystalline silicon.

Figure 2:
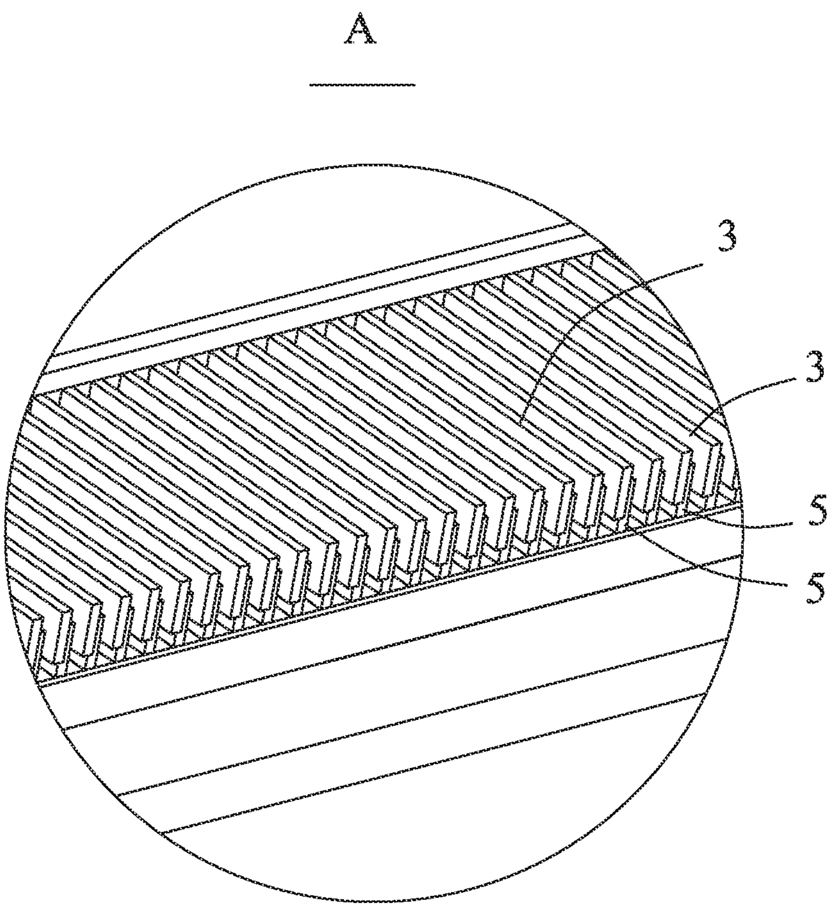
FIG. 2 is an enlarged view of a portion A shown in FIG. 1.

FIG. 2 is an enlarged view of a portion A shown in FIG. 1. As shown in FIG. 1, the rotor comb fingers 3 may be arranged at the edge of the plate 8 adjacent to the second edge 2*a* and extend away from the edge of the plate 8 adjacent to the second edge 2*a*.

Figure 3:
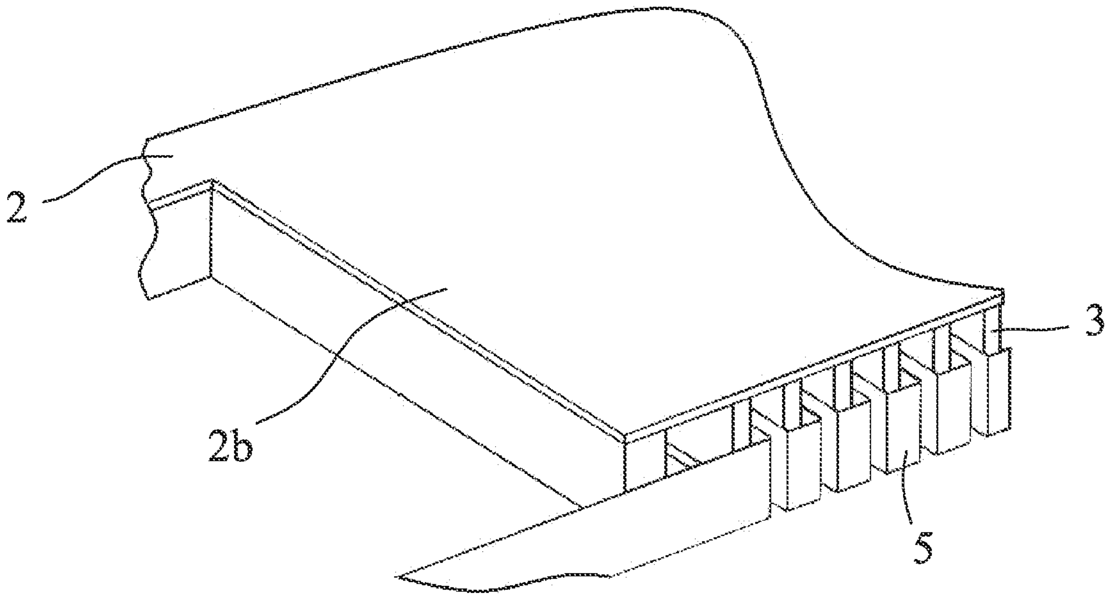
FIG. 3 is a schematic diagram of a portion of a cantilever microphone according to another embodiment of the present disclosure.

FIG. 3 is a schematic diagram of a portion of a cantilever microphone according to another embodiment of the present disclosure. The rotor comb fingers 3 may be arranged at a surface of the plate 8 facing the rotor frame 7, and are vertically arranged in a direction perpendicular to the edge of the plate 8 adjacent to the second edge 2*a*. As shown in FIG. 3, the rotor comb fingers 3 are arranged in a comb area 2*b* of the plate 8.

In an embodiment, the comb area 2*b* is made of a conductive material. Through using the conductive material for the comb area of the plate covering the rotor comb fingers, the performance of the cantilever microphone can be improved significantly. Specifically, by controlling the distance between the conductive plate and the top part of the stator comb, it is possible to greatly decrease the electrostatic non-linearities and eventually the distortion.

Figure 4:
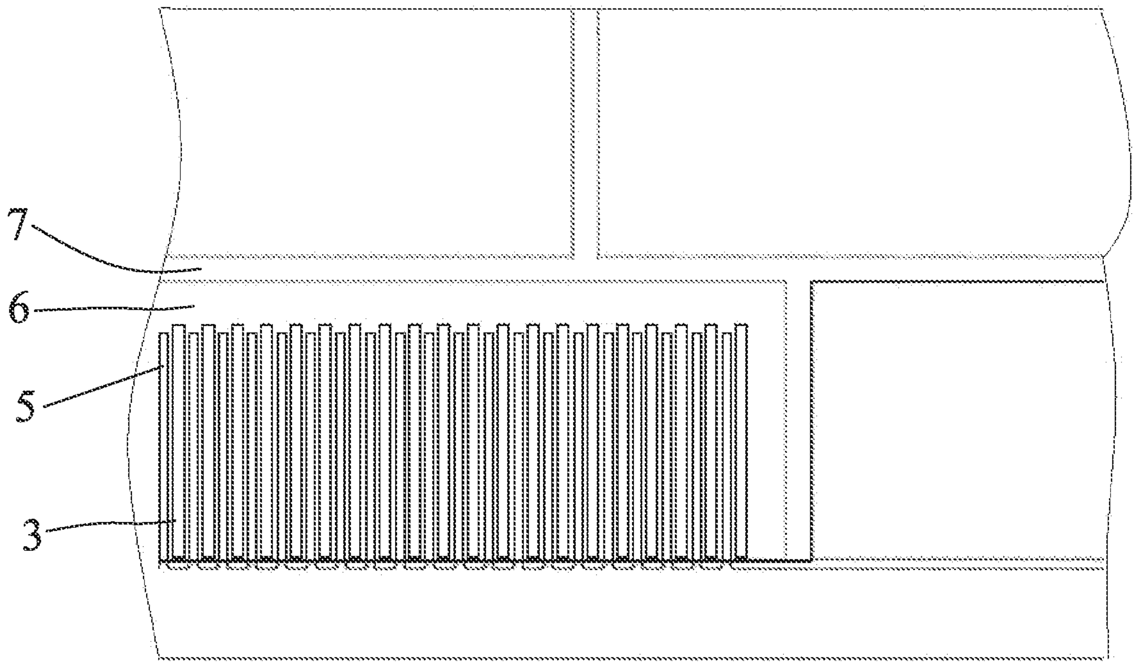
FIG. 4 is a perspective view of a portion of a cantilever microphone according to another embodiment of the present.

FIG. 4 is a perspective view of a portion of a cantilever microphone according to another embodiment of the present. As shown in FIG. 4, a gap 6 is provided between the rotor comb fingers and the rotor frame.

Figure 5:
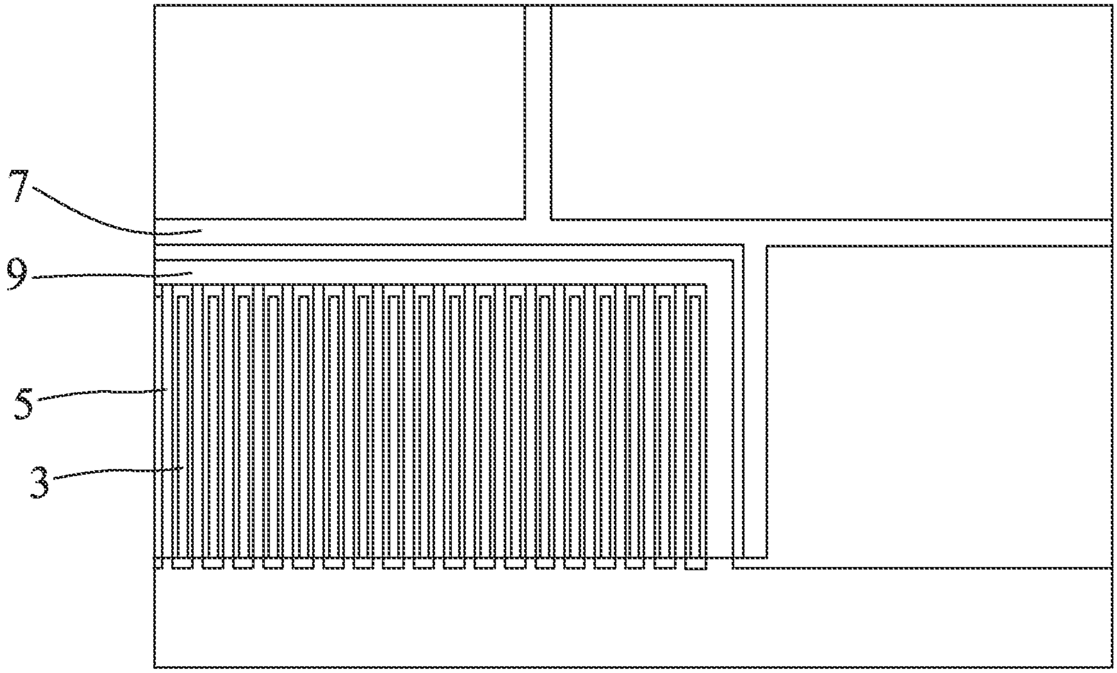
FIG. 5 is a perspective view of a portion of a cantilever microphone according to another embodiment of the present.

As shown in FIG. 5, the stator 4 may further include a stator frame 9, and the stator comb fingers 5 are fixedly connected to the stator frame 9. In an embodiment, the stator frame 9 surrounds the stator comb fingers 5. The stator frame 9 may be provided under the plate 8 of the cantilever 2. In an embodiment, the stator frame 9 may be provided at the gap 6 between the rotor comb fingers and the rotor frame.

For the technical scheme described above, though providing the stator frame, the robustness of the stator can be improved, and the prevention against stiction between the stator comb finger and the rotor comb finger can be improved.

Figure 6:
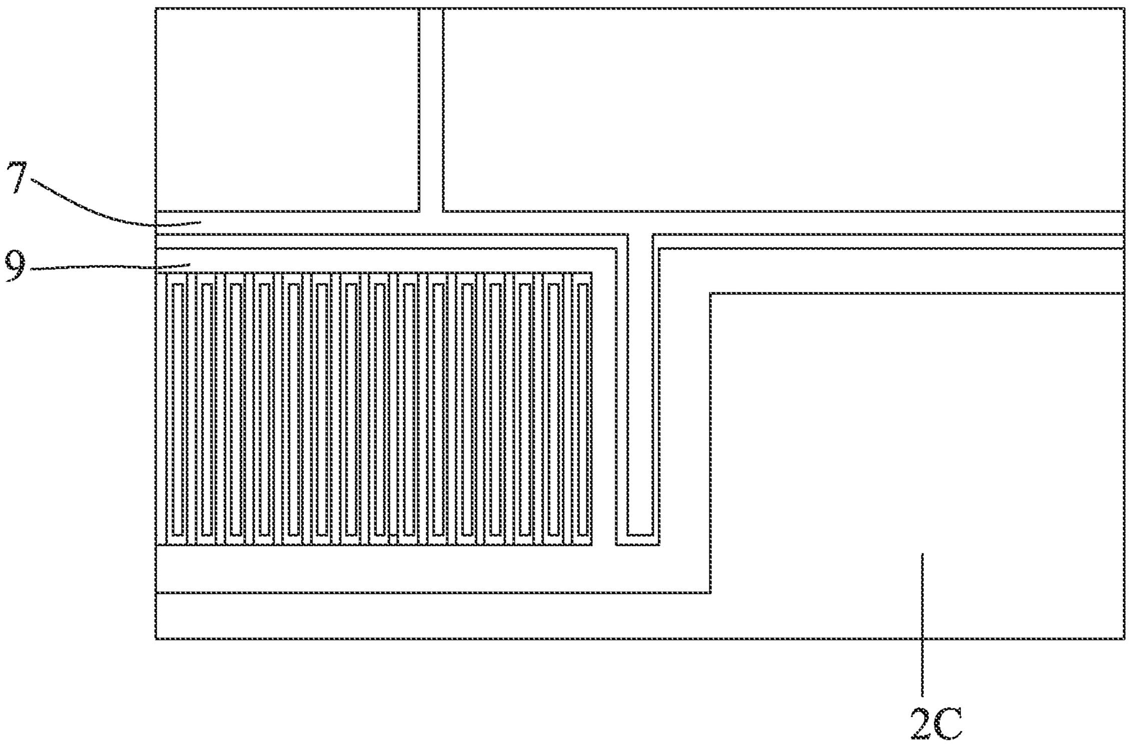
FIG. 6 is a perspective view of a portion of a cantilever microphone according to another embodiment of the present.

As shown in FIG. 6, the plate 8 includes an extension portion 2*c* extending outside the rotor frame 9, to cover at least a part of the substrate 1 and/or the stator 4. The extension portion 2*c* is spaced from the substrate 1 and/or the stator 4.

Though providing the extension portion of the plate, the acoustic resistance of the vent hole is increased, so as to allow a different control of the roll-off of the microphone. In traditional microphone, the vent hole is only a little opening made on purpose. Here, a disadvantage of a cantilever microphone is that this vent hole is necessarily all around the cantilever because the edges are free. And a large or long vent hole is not good for the SNR. A distance substrate/edge of the cantilever frame of 0.1 um to Sum is preferred. And preferentially the smaller the better. Since it might not be possible to have this dimension too small due to the movement of the cantilever, a way to overcome the low acoustic resistance is to extend the plate to cover this gap, preferentially all over the edges of the cantilever. By doing so, the acoustic resistance is not driven by the gap edge of cantilever frame/substrate, but driven the gap between the plate and the substrate. So the edge gap can be increased (thus easier to fabricate), while the roll-off is now controlled by the gap plate/substrate.

In an embodiment, the rotor comb fingers are made of an insulating material and the stator comb fingers are made of a conductive material, or the opposite (conductive rotor comb fingers and insulating stator comb fingers). Here instead of creating a capacitor between two adjacent combs, the capacitor is created between two combs from the same component (either the rotor or the stator) and the comb finger in between from the other component made of insulating material changes the capacitance between the two conductive comb fingers. This concept is due to the relationship $C=\varepsilon \cdot A/d$ where $\varepsilon$ is the dielectric constant of the material between the two electrodes, A is the adjacent area between the two electrodes and d is the gap between the two electrodes: when the rotor is actuated with a sound pressure, instead of modifying the adjacent area of adjacent combs (A), the dielectric constant c between the adjacent combs is modified because the insulating comb finger modifies the dielectric constant where the electric field propagates (in this case, the gap d is the gap between two electrodes of the same component—either stator or rotor—, it is different from the previous case where the gap between two electrodes is also the comb gap as each adjacent comb finger is opposed electrodes).

With such embodiment, one should build the structure by paying attention to the more complex electrical routing on the single component where the conductive combs are, and also to the parasitic capacitances (because the bias electrodes and the sensing electrodes would be very close to each other on multiple areas).

This embodiment makes more complex the electrical routing on one component but removes any electrical part on the other component.

Dimensions: the following dimensions are for the embodiments of the present disclosure.

The comb gap shall be comprised between 0.1 um and 5 um.

The comb finger height shall be comprised between 1 um and 50 um. The rotor comb finger height and the stator comb finger height are not necessarily equal: for example, the stator comb fingers height may be 10 um and the rotor comb fingers height may be anything height from the 10 um to 1 um.

Independently from the dimensions above, the ratio comb height over comb gap shall be comprised between 1 and 100.

The above-described embodiments are merely preferred embodiments of the present disclosure and are not intended to limit the present disclosure. Any modifications, equivalent substitutions and improvements made within the principle of the present disclosure shall fall into the protection scope of the present disclosure.

What is claimed is:

1. A cantilever microphone, comprising:

a substrate;

a cantilever comprising a rotor frame and a plate covering the rotor frame, wherein the cantilever comprises a first edge fixed to the substrate and a second edge opposite to the first edge, a plurality of rotor comb fingers is attached to the plate at an edge of the plate adjacent to the second edge; and a stator fixed to the substrate or attached to a sub structure to allow some displacement from the substrate, wherein the stator comprises a plurality of stator comb fingers, and the plurality of stator comb fingers are interdigitated with the plurality of rotor comb fingers, wherein a gap is provided between the plurality of rotor comb fingers and the rotor frame, and wherein a material of the rotor frame comprises at least one of polycrystalline silicon, silicon nitride, silicon oxide, or silicon carbide, wherein a distance between the plate and an end of one of the plurality of stator comb fingers adjacent to the plate is controlled, to decrease electrostatic non-linearities and distortion.

2. The cantilever microphone as described in claim 1, wherein the plurality of rotor comb fingers are arranged at a surface of the plate facing the rotor frame, and are vertically formed in a direction perpendicular to the edge of the plate adjacent to the second edge.

3. The cantilever microphone as described in claim 2, wherein a comb gap is provided between one of the plurality of rotor comb fingers and one of the plurality of stator comb fingers adjacent thereto, and the comb gap is within a range from 0.1 um to 5 um.

4. The cantilever microphone as described in claim 3, wherein a height of each of the plurality of rotor comb fingers is within a range from 1 um to 50 um; and a height of each of the plurality of stator comb fingers is within a range from 1 um to 50 um.

5. The cantilever microphone as described in claim 4, wherein a ratio of the comb height to the comb gap is within a range from 1 to 100.

6. The cantilever microphone as described in claim 1, wherein the stator further comprises a stator frame, and the plurality of stator comb fingers are fixedly connected to the stator frame.

7. The cantilever microphone as described in claim 6, wherein the stator frame surrounds the plurality of stator comb fingers.

8. The cantilever microphone as described in claim 1, wherein the plate comprises an extension portion extending outside the rotor frame, to cover at least a part of the substrate or the stator.

9. The cantilever microphone as described in claim 1, wherein a material of the plate comprises at least one of silicon nitride, silicon oxide, polymer, silicon carbide or polysilicon.

10. The cantilever microphone as described in claim 9, wherein a surface of the plate facing the rotor frame comprises a conductive material.

11. The cantilever microphone as described in claim 9, wherein a portion of the plate where the plurality of rotor comb fingers are arranged is made of an electroconductive material.

12. The cantilever microphone as described in claim 1, wherein the plurality of rotor comb fingers and the plurality of stator comb fingers are made of a conductive material.

13. The cantilever microphone as described in claim 1, wherein the plurality of rotor comb fingers are made of an insulating material and the plurality of stator comb fingers are made of a conductive material; or the plurality of rotor comb fingers are made of a conductive material and the plurality of stator comb fingers are made of an insulating material.

14. The cantilever microphone as described in claim 1, wherein the plurality of rotor comb fingers and the plurality of stator comb fingers are made of monocrystalline silicon or polycrystalline silicon.

* * * * *